(12) United States Patent
Ma et al.

(10) Patent No.: US 9,408,106 B2
(45) Date of Patent: Aug. 2, 2016

(54) METHOD AND DEVICE FOR LOADING READ CONTENT

(71) Applicant: Tencent Technology (Shenzhen) Company Limited, Shenzhen (CN)

(72) Inventors: Ning Ma, Shenzhen (CN); Zhou Feng, Shenzhen (CN); Sha Mo, Shenzhen (CN); Tingyong Tang, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 94 days.

(21) Appl. No.: 14/288,655

(22) Filed: May 28, 2014

(65) Prior Publication Data
US 2014/0286166 A1    Sep. 25, 2014

Related U.S. Application Data

(63) Continuation of application No. PCT/CN2014/072302, filed on Feb. 20, 2014.

(30) Foreign Application Priority Data

Mar. 20, 2013  (CN) .......................... 2013 1 0091457

(51) Int. Cl.
*H04L 12/26*  (2006.01)
*H04W 28/02*  (2009.01)
*H04L 29/08*  (2006.01)
*G06F 17/30*  (2006.01)
*H04W 4/18*  (2009.01)

(52) U.S. Cl.
CPC ........... *H04W 28/0231* (2013.01); *G06F 17/30* (2013.01); *H04L 67/06* (2013.01); *H04L 67/32* (2013.01); *H04W 4/18* (2013.01); *H04W 28/0226* (2013.01)

(58) Field of Classification Search
None
See application file for complete search history.

(56) References Cited

U.S. PATENT DOCUMENTS

| | | | | |
|---|---|---|---|---|
| 7,761,534 B2 * | 7/2010 | Ehrich | ................... | H04N 67/02 709/217 |
| 8,327,273 B2 * | 12/2012 | Christianson | ...... | G06F 17/30905 709/217 |
| 8,914,004 B2 * | 12/2014 | Cho | ........................ | H04W 4/18 379/201.05 |
| 2003/0167334 A1 * | 9/2003 | Butler | ..................... | H04L 29/06 709/227 |
| 2003/0187553 A1 | 10/2003 | Dillen et al. | | |

FOREIGN PATENT DOCUMENTS

| CN | 102571938 | | 7/2012 |
|---|---|---|---|
| CN | 102866993 | | 1/2013 |
| CN | 102866993 A | * | 1/2013 |

OTHER PUBLICATIONS

International Search Report Mailed May 21, 2014.
Written Opinion PCT/ISA/237 Mailed May 21, 2014.

* cited by examiner

*Primary Examiner* — Willie J Daniel, Jr.
(74) *Attorney, Agent, or Firm* — Dilworth & Barrese, LLP.

(57) ABSTRACT

The present disclosure is applied in field of mobile internet, and provides method and device for loading a read content, the method includes: acquiring a loading condition evaluation parameter of the mobile terminal, the loading condition evaluation parameter including a network environment parameter; determining a loading condition level of the mobile terminal according to the loading condition evaluation parameter; adapting a loading strategy corresponding to the loading condition level in a preset loading strategy table; loading the read content according to the loading strategy. The embodiments of the present method can adapt a suitable loading strategy for the read content needs to be loaded according to the network environment, in which the mobile terminal is currently, so as to implement an adaptive adjustment of the loading strategy and ensure that the read content can be loaded in a shortest time no matter of the network environment.

14 Claims, 3 Drawing Sheets

METHOD AND DEVICE FOR LOADING READ CONTENT

REFERENCE TO PRIOR APPLICATIONS

This application is a continuation of International Application No. PCT/CN2014/072302, filed on Feb. 20, 2014, which claims priority to Chinese patent application No. 201310091457.3, filed on Mar. 20, 2013, the content of which are incorporated herein by reference in their entirety.

TECHNICAL FIELD

The present disclosure relates to technical field of loading internet content, and in particular relates to a method and device for loading a read content.

BACKGROUND

Under the background of the booming of the mobile internet, a read software applied in the mobile terminal has popularized more widely, and brings the user more pure reading experience by grabbing, analyzing, purifying, and processing the various webpage information on the internet at the cloud end. As compared with the conventional webpage type reading, its format is more beautiful, its content is more concentric, and more favor of the user is obtained.

Such conventional read software mainly adopts a fixed loading mode of the read content. For example, in one loading procedure, for a list of the headline of the news, fixed number of the headline of the news are loaded; for detail of the news, entire article is loaded; and for the picture, pictures with same quality are loaded. However, the network environments accessed by the conventional mobile terminals are different from each other, and the current fixed loading mode of the read content can't carry out an adaptive adjustment according to the network environment in which the mobile terminal is currently, which easy to cause waste of the network resource or overloading operation of the network resource and reduces the loading efficiency of the read content of the mobile terminal.

SUMMARY

There provides a method for loading a read content, winch may cause a load efficiency of the read content of the mobile terminal is low.

An embodiment of the present disclosure is implemented by a method for loading a read content which includes: acquiring a loading condition evaluation parameter including a network environment parameter; determining a loading condition level of the mobile terminal according to the loading condition evaluation parameter; adapting a loading strategy corresponding to the loading condition level; and loading a read content according to the loading strategy.

Another embodiment of the present disclosure provides a device for loading read content which includes: an acquiring unit for acquiring a loading condition evaluation parameter of the mobile terminal, the loading condition evaluation parameter including a network environment parameter; a determining unit for determining a loading condition level of the mobile terminal according to the loading condition evaluation parameter; an adapting unit for adapting a loading strategy corresponding to the loading condition level; and a loading unit for loading a read content according to the loading strategy.

The embodiments of the present disclosure can adapt a suitable loading strategy for the read content to be loaded according to the network environment in which the mobile terminal is currently, so as to implement an adaptive adjustment of the loading strategy and ensure that the read content can be loaded in a shortest time no matter of the network environment, which increases the loading efficiency of the read content of the mobile terminal.

DETAILED DESCRIPTION

In order to make the purposes, the technical solutions and the advantages of the present disclosure more clear, the present disclosure is further described detailed in combination with the accompanying drawings and embodiments. It is understood that the specific embodiments described here are only for explaining the present disclosure but not for limiting the present disclosure.

The embodiments of the present disclosure can adapt a suitable loading strategy for the read content to be loaded according to the network environment in which the mobile terminal is currently, so as to implement an adaptive adjustment of the loading strategy and ensure that the read content can be loaded in a shortest time no matter of the network environment, which increases the loading efficiency of the read content of the mobile terminal.

The method for loading a read content provided by the embodiment of the present disclosure can be applied to run in a reading software of the mobile terminal, and the mobile terminal includes, but not limited to a terminal apparatus having a mobile internet access function such as a mobile phone, a tablet computer or the like, which are not defined one by one.

In the present embodiment, a read content needs to be loaded is grabbed, analyzed, purified and edited, compiled from the large amount of the webpage issue content of the internet by the server, and issued by a reading software running in the mobile terminal. The reading software acquires an up-to-date data which have not been loaded in the reading software from the server by sending a loading request to the server, wherein the loaded read content includes, but is not limited to the text and the picture.

Figure 1:
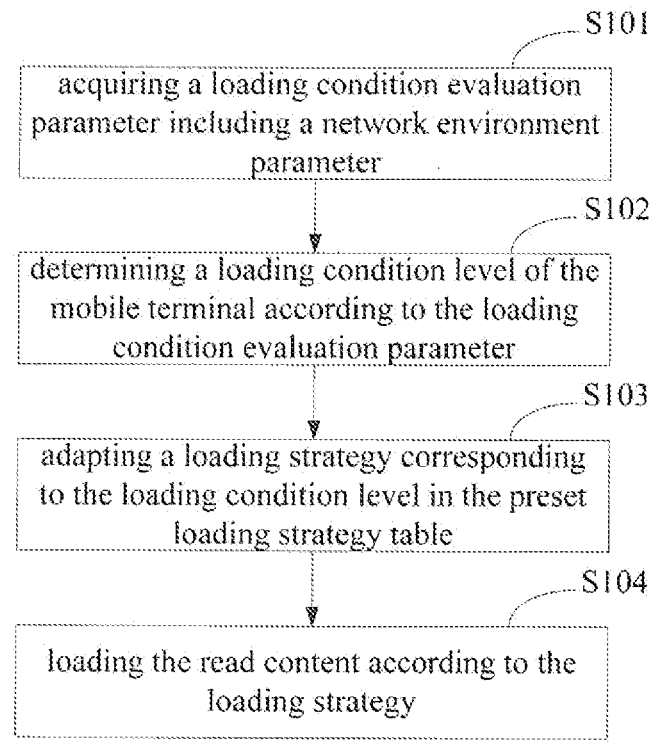
FIG. 1 is a flow chart of an implementation of the method for loading a read content provided by a first embodiment of the present disclosure.

FIG. 1 illustrates a flow of an implementation of the method for loading a read content provided by the first embodiment of the present disclosure. The flow is described detailed as follows.

In step S101, a loading condition evaluation parameter of the mobile terminal is acquired, the loading condition evaluation parameter includes a network environment parameter.

In the present embodiment, a strategy loading of the read content by the mobile terminal needs to be determined according to network environment in which the mobile terminal is currently. Therefore, in step S101, the network environment parameter of the mobile terminal is acquired firstly, and the good or bad of the network environment in which the mobile terminal is currently is evaluated according to the network environment parameter.

In particular, the network environment parameter can include types of the network accessed by the mobile terminal. Here, the types of the network accessed by the mobile terminal include, but are not limited to the wireless fidelity technique (Wireless Fidelity, Wi-Fi) network, or the second generation mobile communication technique (2G) such as the general packet radio service technique (General Packet Radio Service, GPRS), or the third generation mobile communication technique (3G) such as the wideband code division multiple access (Wideband Code Division Multiple Access, WCDMA), the time division synchronous code division multiple access (Time Division-Synchronous Code Division Multiple Access, TD-SCDMA), or the CDMA2000 or the like, and also include the fourth generation mobile communication technique (4G) such as the long-term evolution ( Long Term Evolution, LTE) or the like. It is obvious that when the network accessed by the mobile terminal is a Wi-Fi network or a 3G network or a 4G network, since the above-described networks have better network bandwidth, the network environment in which the mobile terminal is at this time is certainly better than the network environment when the mobile terminal accesses a 2G network.

Further, the network environment parameter may also include at least one of the following: a current network speed of the mobile terminal and a historical average velocity of the mobile terminal loading a read content of a single page.

Here, the current network speed of the mobile terminal is obtained by statistic carried out at the backstage in case the mobile terminal accessing the network. Preferably, it is a network speed average value in a preset time period before the current time point in a precondition of the mobile terminal accessing the networks of same type. For example, in a precondition of the mobile terminal accessing a Wi-Fi network, the average value of network speed in twenty minutes before the current time point is made statistic, and the statistical value can represent the current actual network connection status of the mobile terminal under a status of accessing a network of a certain special type.

The historical average speed of the mobile terminal loading a read content of a single page is obtained by being computed by statistic at the backstage when the mobile terminal loads the read content of each page previously, and with the increase of the number of the pages loaded, accuracy of this statistical value is higher.

In step S102, a loading condition level of the mobile terminal is determined according to the loading condition evaluation parameter.

In the present embodiment, according to the difference of a value taken by the loading condition evaluation parameter, corresponding loading condition level of the mobile terminal can be determined, wherein the loading condition level is for representing a loading capacity which is achievable by the mobile terminal currently, and indicating whether the mobile terminal can load lots of content of picture and text, to determine a loading strategy suitable of the current running condition of the mobile terminal according to the loading condition level.

In particular, when the number of the loading condition evaluation parameter for determining the loading condition level is only one, the correspondence relationship between the loading condition evaluation parameter and the loading condition level can be established by setting one grade of the loading condition level for each value taken by the loading condition evaluation parameter in advance; and, when the number of the loading condition evaluation parameter for determining the loading condition level is plural, the corresponding loading condition level can be determined by taking factors for each loading condition evaluation parameter, computing the synthesized value taken by a plurality of loading condition evaluation parameters with statistical method such as factors weighting, averaging or the like and then by correspondence relationship between each synthesized taken value established in advance and the loading condition level.

In step S103, a loading strategy corresponding to the loading condition level in preset loading strategy table is adapted.

In the present embodiment, the loading strategy table is preset by the system, and indicates a one-to-one correspondence relationship between the loading condition level and the loading strategy. Each loading strategy in the loading strategy table indicates that the mobile terminal needs to select a picture of which quality to load and how many abstracts of the read content needs to be load at one time and the percentage of the text content to be loaded in the loading procedure of the read content needs to be loaded currently. Here, the abstract is presented in form of the list or a lattice with nine grids of the thumbnail content of the read title, the read abstract text, the abstract picture, the issue time, the issue source or the like of a plurality of read contents; and the text content, is the detailed part of each read content, which includes text, author, time, source, picture, external links or the like that the read content has.

As one implementation example of the present disclosure, the preset loading strategy table is shown as table 1:

TABLE 1

| | Loading condition level | | | | | |
|---|---|---|---|---|---|---|
| | Level one | Level two | Level three | Level four | Level five | Level six |
| Loading strategy of text | Least text | Least text | Less text | Medium text | Medium and much text | Much text |
| Loading strategy of picture | No loading | Picture with very low quality | Picture with low quality | Picture with medium quality | Picture with medium quality | Picture with high quality |

The loading strategy table is obtained by excavating huge amount of data and making statistic by the server end and can be adjusted at the server end in real time along with the increase of the statistical accuracy, and the adjusted and upgraded loading strategy table is synchronized to the mobile terminal.

In step S104, the read content is loaded according to the loading strategy.

In particular, the read content is loaded by determining the quality of picture and the amount of text specified in the loading strategy according to the loading strategy acquired in step S103. For example, if the quality of picture specified in the loading strategy is picture with medium quality and the amount of text is 80%, in the procedure of loading the current read content, version with medium quality is loaded for the picture in the read content and text of the former 80% is loaded for the text in the read content.

Thus, different loading strategies can be adapted adaptively for different network running environments of the mobile terminal. In a network of better condition such as Wi-Fi or the like, a picture with higher quality is loaded and more text content is displayed to bring the advantage of the network speed into play; and in a network of lower speed such as GPRS or the like, a picture with lower quality is loaded and a part of text content is displayed firstly, to ensure the speed of loading the read content and to display the read content, in shortest time, which increases the loading efficiency of the read content of the mobile terminal.

As one embodiment of the present disclosure, in the procedure of determining the loading strategy of the mobile terminal in addition to considering the network environment of the mobile terminal, it can further consider according to data types of the read content loaded currently. Therefore, in the present embodiment, the loading condition evaluation parameter further includes types of the read content to be loaded currently by the mobile terminal and average data amount of a single page of this type of read content.

Here, types of the read content to be loaded currently by the mobile terminal include, but are not limited to a channel of text type, a channel of picture type or a channel of picture and text mixed type, wherein the channel is a collective page concentrating a certain amount of abstracts and details of the read content, for example, "news channel", "picture channel", and so on. According to the difference of the types of the read content, it can estimate roughly that the read content belonging to this type of the read content gives priority to picture or text, since the data amount of the read content including picture must be larger than data amount of the read content including only the text. Whether the data amount of the read content to be loaded currently is large or small can be decided according to types of the read content.

Further, the average data amount of a single page of the type of the read content is counted and sent to the mobile terminal by the server providing the read content, and refers to data displayed in one screen exactly, which can reflect average data amount scale of a certain type of the read content.

As one preferable embodiment of the present disclosure, the above-described loading condition evaluation parameter can be concerned totally, where the loading condition evaluation parameter includes the types of the network accessed by the mobile terminal, the current network speed of the mobile terminal, the historical average speed of the mobile terminal loading a single page of the read content, the types of the read content to be loaded currently by the mobile terminal and the average data amount of a single page of this type of the read content. The loading condition level of the mobile terminal is determined by statistical scheme of weighting.

Figure 2:
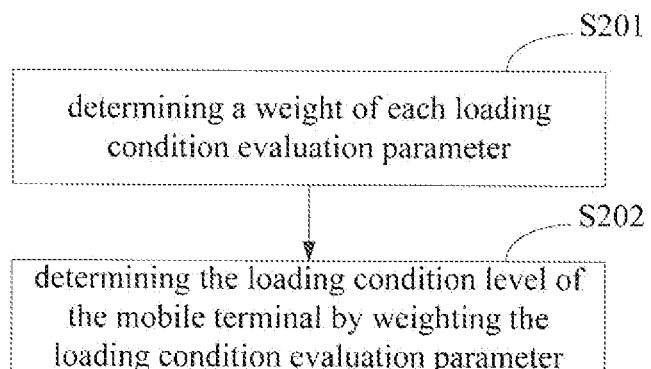
FIG. 2 is a flow chart of a specific implementation of step S102 in the method for loading a read content provided by the first embodiment of the present disclosure.

FIG. 2 is a flow chart of a specific implementation of step S102 in the method for loading a read content provided by the first embodiment of the present disclosure. As shown in FIG. 2, step S102 is specifically as follows.

In step S201, the weight of each loading condition evaluation parameter is determined.

In step S202, the loading condition level of the mobile terminal is determined by weighting the loading condition evaluation parameter.

Preferably, the loading condition level of the mobile terminal can be determined according to the following formula:

$$F_c = \alpha \times NT + \beta \times \frac{D_a}{\lambda \times NS_a + \mu \times NS_c} \times \frac{1}{F_{NT}} + \gamma \times DT$$

Wherein $\lambda$, $\mu$, $\alpha$, $\beta$ and $\gamma$ are all constant and $\lambda+\mu=1$, $\alpha+\beta+\gamma=1$.

In the above formula, $F_c$ is the loading condition level. NT represents the type of the network accessed by the mobile terminal and can be a positive integer. For example, the 2G network is 4, the 3G network is 3, and the Wi-Fi network is 1. The more NT is, the poorer the network speed of this type of the network is. $D_a$ is the average data amount of a single page of the type of the read content needs to be loaded currently. $NS_a$ is the historical average speed of the mobile terminal loading a single page of the read content. $NS_c$ a is the current network speed of the mobile terminal. $F_{NT}$ is also for representing the type of the network accessed by the mobile terminal, and has a same trend of increase and decrease but a different value with the NT, and represents the network speed proportion of the respective types of the network. DT is the type of the read content to be loaded currently by the mobile terminal.

With the above formula, the more a cut-off of the acquired $F_c$ is, the lower the loading condition level is. The loading strategy is for ensuring a fast display of the current read content with the data amount as small as possible, for example, with not pictured loaded and the least text loaded.

Figure 3:
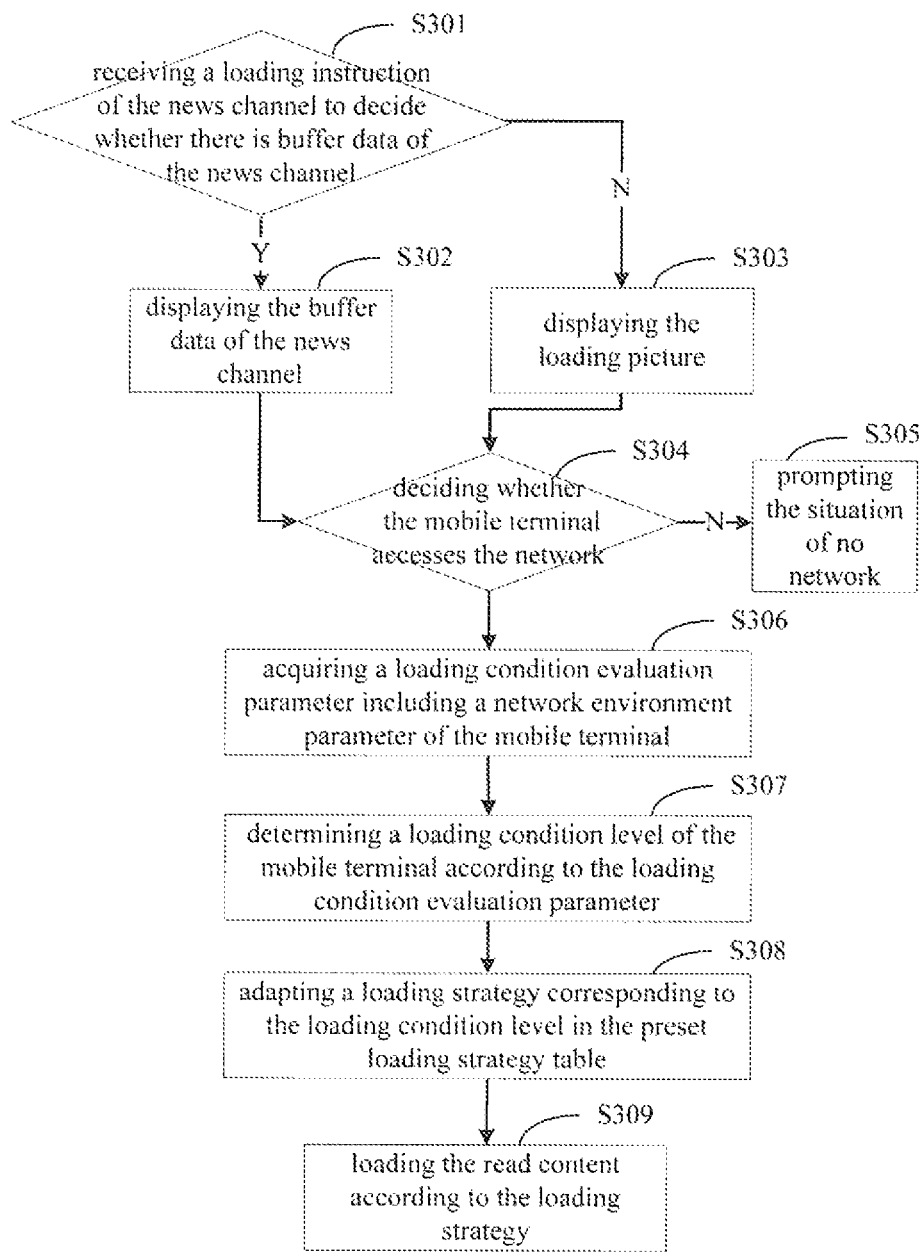
FIG. 3 is a flow chart of the method for loading a read content of a second embodiment of the present disclosure.

Based on the above-described method for loading a read content, FIG. 3 illustrates the loading procedure of the entire "news channel" by taking a user clicking the "news channel" in the reading software as an example.

In step S301, a loading instruction of the news channel is received to decide whether there is buffer data of the news channel. And step S302 is executed if so, in which the buffer data of the news channel is displayed before loading is completed, and otherwise step S303 is executed in which, the loading picture is displayed.

Here, the buffer data of the news channel can be the read content of the news channel that has been loaded previously.

In step S304, whether the mobile terminal accesses the network is decided. And step S305 is executed to prompt the situation of no network at the mobile terminal if not, and step S306 is executed if so.

In step S306 to S309, steps shown in FIG. 1 of the present disclosure is executed, by which the loading condition evaluation parameter is acquired, the loading condition level is determined, and the corresponding loading strategy is adapted according to the loading condition level to complete loading of the read content in the news channel.

Figure 4:
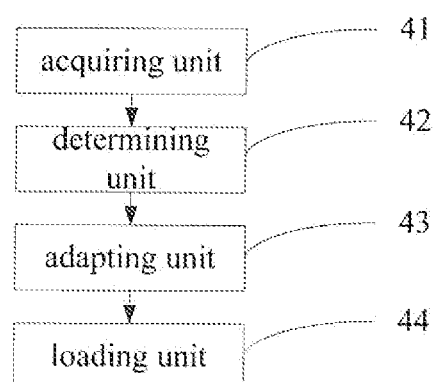
FIG. 4 is a block view of a structure of the device for loading a read content provided by the embodiments of the present disclosure.

FIG. 4 illustrates a block view of a structure of a device for loading a read content provided by the embodiments of the present disclosure, the device can be in the mobile terminal for running the method for loading a read content of the embodiments shown in FIG. 1 and FIG. 2 of the present disclosure. For the convenience of explanation, only parts related to the present embodiment are shown.

An acquiring unit 41 is configured to acquire a loading condition evaluation parameter of the mobile terminal, with the loading condition evaluation parameter including network environment parameter.

A determining unit 42 is configured to determine a loading condition level of the mobile terminal according to the loading condition evaluation parameter.

An adapting unit 43 is configured to adapt a loading strategy corresponding to the loading condition level in a preset loading strategy table.

A loading unit 44 is configured to load read content according to the loading strategy.

Optionally, the network environment parameter includes the types of the network accessed by the mobile terminal.

Optionally, the network environment parameter includes at least one of the current network speed of the mobile terminal and the historical average speed of loading a single page of the read content by the mobile terminal.

Optionally, the loading condition evaluation parameter further includes the type of the read content to be loaded currently by the mobile terminal and average data amount of a single page of the type of the read content.

Optionally, the determining unit 42 includes a first determining subunit configured to determine weight of each loading condition evaluation parameter and a second determine subunit configured to determine the loading condition level of the mobile terminal by weighting the loading condition evaluation parameter.

Optionally, the second determining subunit is specifically configured to determine the loading condition level of the mobile terminal according to the formula:

$$F_c = \alpha \times NT + \beta \times \frac{D_a}{\lambda \times NS_a + \mu \times NS_c} \times \frac{1}{F_{NT}} + \gamma \times DT.$$

Where, $\gamma$, $\mu$, $\alpha$, $\beta$ and $\gamma$ are all constant and $\lambda+\mu=1$, $\alpha+\beta+\gamma=1$. $F_c$ is the loading condition level. Both of the NT and $F_{NT}$ represent the type of the network accessed by the mobile terminal, the NT and $F_{NT}$ have the same trend of increase and decrease but different values. $D_a$ is the average data amount of a single page of the type of the read content to be loaded currently. $NS_a$ is the historical average speed of the mobile terminal loading a single page of the read content. $NS_c$ the current network speed of the mobile terminal. DT is the type of the read content to be loaded currently by the mobile terminal.

Optionally, the loading unit 44 is specifically configured to load the read content according to the quality of picture and amount of text specified in the loading strategy.

The embodiments of the present disclosure can adapt a suitable loading strategy for the read content to be loaded according to the network environment in which the mobile terminal is currently, so as to implement an adaptive adjustment of the loading strategy and ensure that the read content can be loaded in a shortest time no matter of the network environment, which increases the loading efficiency of the read content of the mobile terminal.

The above mentioned is only preferred embodiments of the present disclosure and does not limit the present disclosure, and any of the modification and equivalent replacement and improvement or the like within the spirit and principle of the present disclosure should be included in the range sought for protection by the present disclosure.

What is claimed is:

1. A method for loading a read content, comprising:
    acquiring a loading condition evaluation parameter including a network environment parameter;
    determining a loading condition level of the mobile terminal according to the loading condition evaluation parameter;
    adapting a loading strategy corresponding to the loading condition level; and
    loading the read content according to the loading strategy,
    wherein determining the loading condition level of the mobile terminal according to the loading condition evaluation parameter comprises:
    determining a weight of each loading condition evaluation parameter; and
    determining the loading condition level of the mobile terminal by weighting the loading condition evaluation parameter,
    wherein determining the loading condition level of the mobile terminal by weighting the loading condition evaluation parameter comprises:
    determining the loading condition level of the mobile terminal according to the formula:

$$F_c = \alpha \times NT + \beta \times \frac{D_a}{\lambda \times NS_a + \mu \times NS_c} \times \frac{1}{F_{NT}} + \gamma \times DT,$$

where, $\lambda$, $\mu$, $\alpha$, $\beta$ and $\gamma$ are all constant, and $\lambda+\mu=1$, $\alpha+\beta+\gamma=1$, $F_c$ is the loading condition level, both of the NT and $F_{NT}$ represent the type of the network accessed by the mobile terminal, the NT and $F_{NT}$ have the same trend of increase and decrease but different values, $D_a$ is the average data amount of a single page of the type of the read content to be loaded currently, $NS_a$ is the historical average speed of the mobile terminal loading a single page of the read content, $NS_c$ is the current network speed of the mobile terminal, and DT is the type of the read content to be loaded currently by the mobile terminal.

2. The method according to claim 1, wherein the network environment parameter comprises types of the network accessed by the mobile terminal.

3. The method according to claim 2, wherein the network environment parameter further comprises at least one of a current network speed of the mobile terminal and a historical average speed of loading a single page of the read content by the mobile terminal.

4. The method according to claim 3, wherein the loading condition evaluation parameter further comprises types of the read content to be loaded currently by the mobile terminal and average data amount of a single page of the type of the read content.

5. The method according to claim 1, wherein loading the read content according to the loading strategy comprises:
    loading the read content according to the quality of picture and amount of text specified in the loading strategy.

6. The method according to claim 1, wherein the loading strategy with different levels corresponds to loading different levels of picture.

7. A device for loading a read content, comprising:
    an acquiring unit configured to acquire a loading condition evaluation parameter of the mobile terminal, the loading condition evaluation parameter including a network environment parameter;
    a determining unit configured to determine a loading condition level of the mobile terminal according to the loading condition evaluation parameter;
    an adapting unit configured to adapt a loading strategy corresponding to the loading condition level; and
    a loading unit configured to load the read content according to the loading strategy, wherein the determining unit comprises:
a first determining subunit configured to determine a weight of each loading condition evaluation parameter; and
a second determining subunit configured to determine the loading condition level of the mobile terminal by weighting the loading condition evaluation parameter,
wherein the second determining subunit is configured to determine the loading condition level of the mobile terminal according to the formula:

$$F_c = \alpha \times NT + \beta \times \frac{D_a}{\lambda \times NS_a + \mu \times NS_c} \times \frac{1}{F_{NT}} + \gamma \times DT,$$

where, $\lambda$, $\mu$, $\alpha$, $\beta$ and $\gamma$ are all constant, and $\lambda+\mu=1$, $\alpha+\beta+\gamma=1$, $F_c$ is the loading condition level, both of the NT and $F_{NT}$ represent the type of the network accessed by the mobile terminal, the NT and $F_{NT}$ have the same trend of increase and decrease but different values, $D_a$ is the average data amount of a single page of the type of the read content to be loaded currently, $NS_a$ is the historical average speed of the mobile terminal loading a single page of the read content, $NS_c$ is the current network speed of the mobile terminal, and DT is the type of the read content to be loaded currently by the mobile terminal.

8. The device according to claim 7, wherein the network environment parameter comprises the types of the network accessed by the mobile terminal.

9. The device according to claim 8, wherein the network environment parameter further comprises at least one of a current network speed of the mobile terminal and a historical average speed of loading a single page of the read content by the mobile terminal.

10. The device according to claim 9, wherein the loading condition evaluation parameter further comprises types of the read content needs to be loaded currently by the mobile terminal and average data amount of a single page of the type of the read content.

11. The device according to claim 7, wherein the loading unit is configured to load the read content according to the quality of picture and amount of text specified in the loading strategy.

12. The device according to claim 7, wherein the loading strategy with different levels corresponds to loading different levels of picture.

13. A non-transitory computer-readable recording medium having embodied thereon a computer program to execute the following steps:
acquiring a loading condition evaluation parameter including a network environment parameter;
determining a loading condition level of the mobile terminal according to the loading condition evaluation parameter;
adapting a loading strategy corresponding to the loading condition level; and
loading the read content according to the loading strategy,
wherein determining the loading condition level of the mobile terminal according to the loading condition evaluation parameter comprises:
determining a weight of each loading condition evaluation parameter; and
determining the loading condition level of the mobile terminal by weighting the loading condition evaluation parameter,
wherein determining the loading condition level of the mobile terminal by weighting the loading condition evaluation parameter comprises:
determining the loading condition level of the mobile terminal according to the formula:

$$F_c = \alpha \times NT + \beta \times \frac{D_a}{\lambda \times NS_a + \mu \times NS_c} \times \frac{1}{F_{NT}} + \gamma \times DT,$$

where, $\lambda$, $\mu$, $\alpha$, $\beta$ and $\gamma$ are all constant, and $\lambda+\mu=1$, $\alpha+\beta+\gamma=1$, $F_c$ is the loading condition level, both of the NT and $F_{NT}$ represent the type of the network accessed by the mobile terminal, the NT and $F_{NT}$ have the same trend of increase and decrease but different values, $D_a$ is the average data amount of a single page of the type of the read content to be loaded currently, $NS_a$ is the historical average speed of the mobile terminal loading a single page of the read content, $NS_c$ is the current network speed of the mobile terminal, and DT is the type of the read content to be loaded currently by the mobile terminal.

14. The non-transitory computer-readable recording medium according to claim 13, wherein loading the read content according to the loading strategy comprises:
loading the read content according to the quality of picture and amount of text specified in the loading strategy.

* * * * *